March 3, 1936.  D. E. LEWELLEN ET AL  2,032,585

VARIABLE SPEED TRANSMISSION MECHANISM

Filed Oct. 4, 1932   3 Sheets-Sheet 1

Inventors
Darcy E. Lewellen
Emmons F. Lewellen

By
Attorney

March 3, 1936.  D. E. LEWELLEN ET AL  2,032,585
VARIABLE SPEED TRANSMISSION MECHANISM
Filed Oct. 4, 1932  3 Sheets-Sheet 2
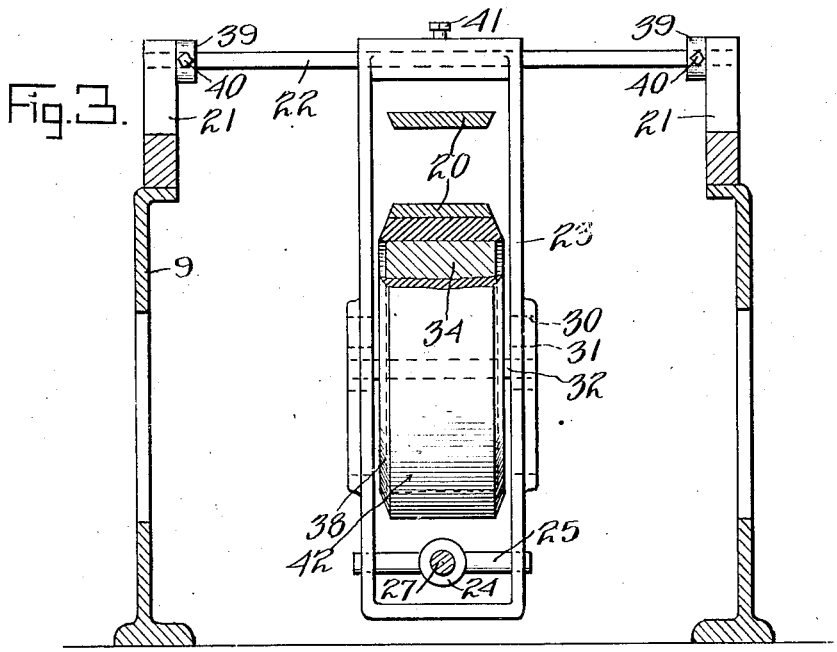
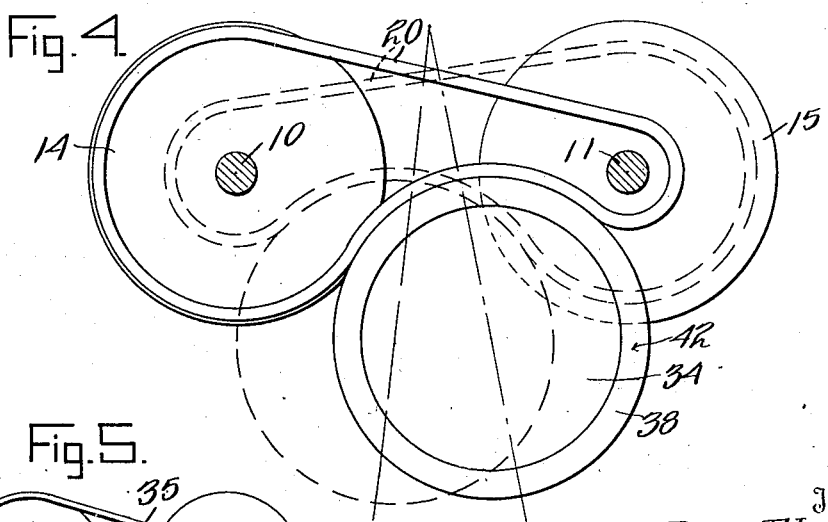
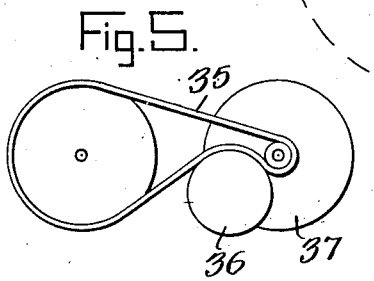
Inventors
Darcy E. Lewellen
Emmons F. Lewellen March 3, 1936.    D. E. LEWELLEN ET AL    2,032,585

VARIABLE SPEED TRANSMISSION MECHANISM

Filed Oct. 4, 1932    3 Sheets-Sheet 3

Inventors
Darcy E. Lewellen
Emmons F. Lewellen

By
Attorney

Patented Mar. 3, 1936

2,032,585

UNITED STATES PATENT OFFICE 2,032,585

VARIABLE SPEED TRANSMISSION MECHANISM

Darcy E. Lewellen and Emmons F. Lewellen, Columbus, Ind.

Application October 4, 1932, Serial No. 636,204

10 Claims. (Cl. 74—230.17)

This invention relates to improvements in variable speed transmission mechanism and it is an object to simplify and improve generally mechanism of this character.

Figure 1:
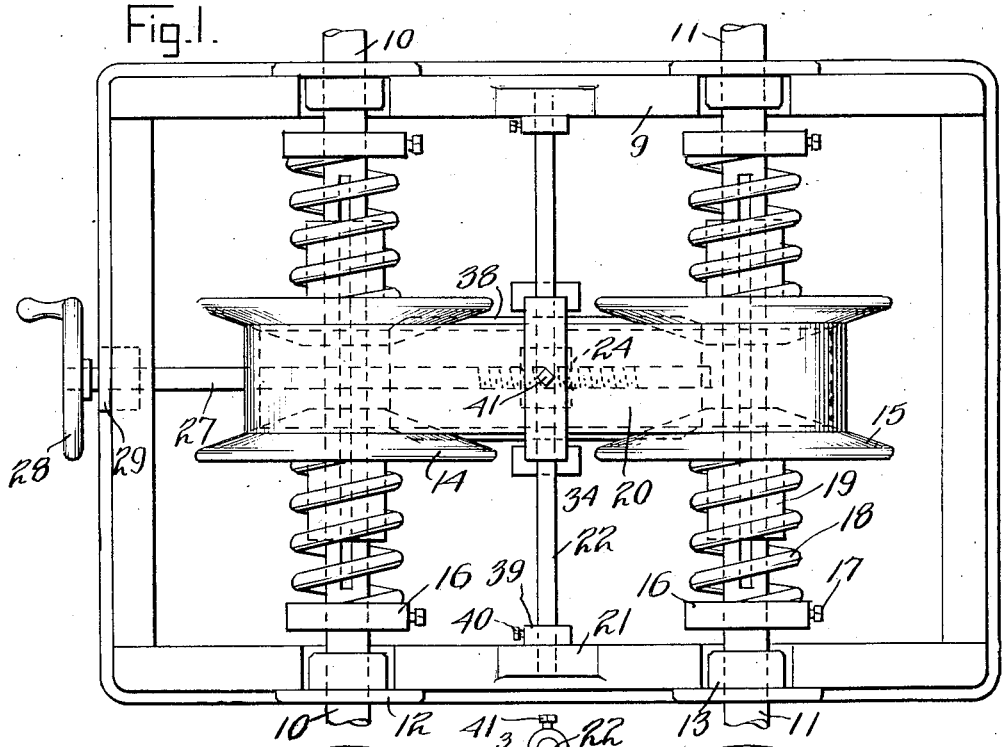
Figure 2:
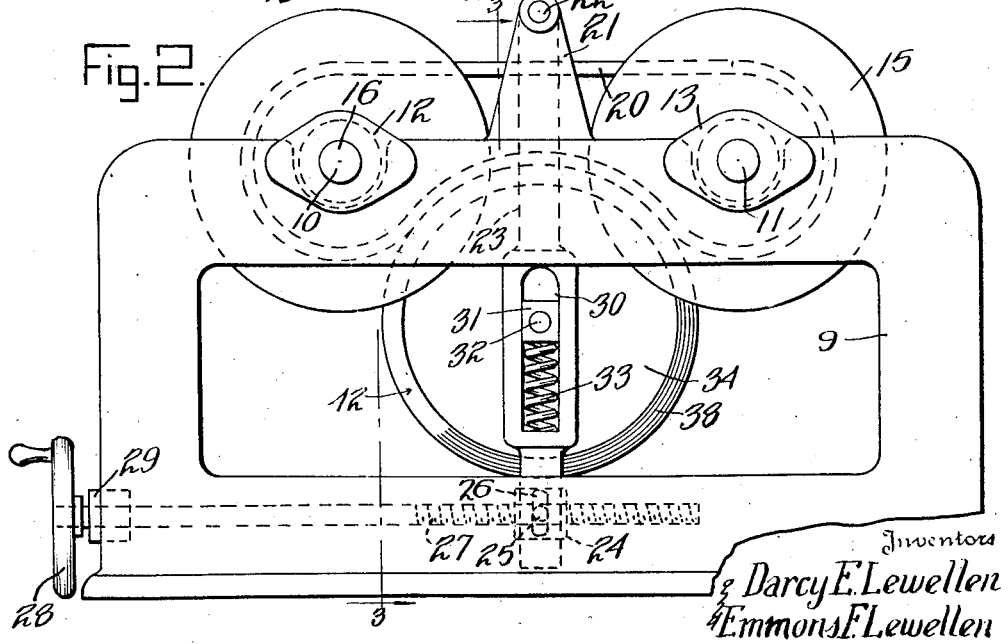
Figure 6:
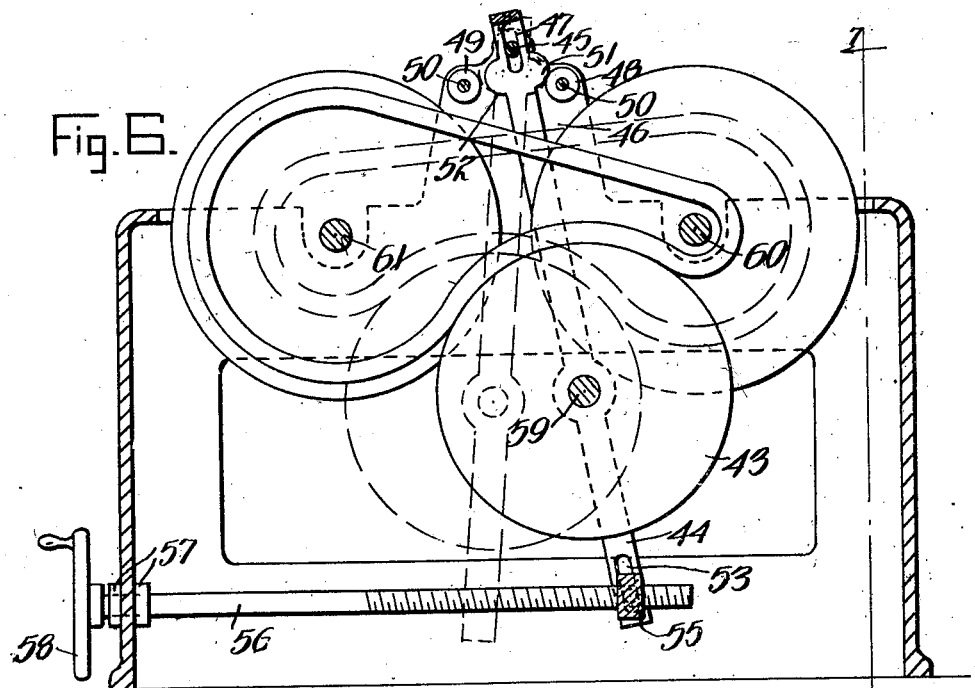
Figure 7:
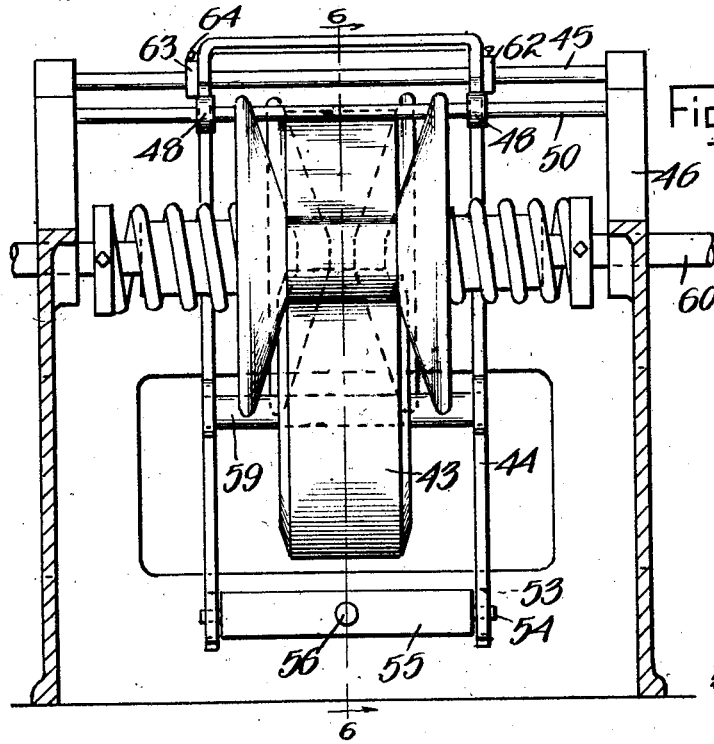

Referring to the accompanying drawings, which are made a part hereof and on which similar reference characters indicate similar parts, Figure 1 is a plan view of the device, Figure 2, a side elevation, Figure 3, a section on line 3—3 of Figure 2, Figure 4, a side elevation showing the several positions of the controlling element for the variable speed transmission pulleys, Figure 5, a side elevation of a modified form of the device, Figure 6, a view partly in side elevation and partially a section substantially on line 6—6 of Figure 7 in which the roller is positively positioned, and Figure 7, a section on line 7—7 of Figure 6.

In the drawings numeral 9 indicates a frame having shafts 10 and 11 journaled therein in suitable bearings 12 and 13 secured to the frame.

The shafts extend beyond the sides of the frame and carry sprockets, pulleys or gears, not shown, by means of which the shafts are driven and by means of which they drive other devices. Power is applied to the sprockets, pulley or gears on one of the shafts and power is taken off from the other shaft in a manner well known. Conical faced disks 14 and 15 are mounted on shafts 10 and 11 respectively. The disks are splined to the shafts on which they are mounted so as to rotate with the shafts but are free to move laterally along the shaft.

Collars 16 are secured to the shafts by set screws 17 and between these collars and the outside faces of the disks 14 and 15 are positioned compression springs 18, these springs surrounding cylindrical extensions or hubs 19 on the disks 14 and 15. The tension of the springs 18 may be controlled by adjusting the collars 16 laterally on the shafts and securing them in adjusted position.

A V-shaped belt 20 is mounted about the cone faces of the disks by means of which belt one shaft is driven from the other. The belt may be of any suitable construction having edges lying at an angle to correspond to the angle of the conical faces on the disks 14 and 15. The disks are held in frictional driving contact with the belt by means of the springs 18.

The frame 9 has upwardly extended lugs 21 having a shaft 22 mounted therein. A yoke 23 is pivotally attached to the shaft 22 so as to swing about the shaft. The lower end of the yoke 23 carries a nut 24, the nut having bosses 25 which extend through slots 26 in the yoke. A screw 27 is threaded through the nut 24 and is operated by means of a handwheel 28. Collars 29 on the shaft 27 hold the shaft 27 against endwise movement. The yoke 23, Figures 2 and 3, has slots 30 in which bearings 31 are slidably mounted and a shaft 32 is mounted in the bearings 31. Springs 33 support the bearings and a roller 34 is mounted upon the shaft 32. In Figure 2 this roller is held in contact upon the belt 20 by means of the springs 33.

From the description given it will be apparent that rotation of the handwheel 28 will swing yoke 23 on its pivot and move the roller 34 toward one of the disks and away from the other. As the roller 34 moves toward one set of disks, these disks are necessarily forced apart. This decreases the effective diameter of the cone faces in this pair of disks. As the roller 34 swings away from the opposite set of disks, these disks are free to come together under the urge of the springs 18, so that the effective diameter of the cone surfaces of these disks will be increased. By swinging the lower end of the yoke 23 to the right as viewed in Figure 4 to bring the roller 34 to the full line position as shown in Figure 4, the effective diameter of the cone surfaces on disks 15 will be decreased, since these disks will be forced apart, so that the belt 20 will assume the positions shown in full lines in Figure 4. If shaft 11 is the driving shaft and shaft 10 the driven shaft, it will be apparent that, when in this position, the shaft 10 will be driven at a much slower speed than the driving shaft 11. The shaft 11 is driven from some source of power and the shaft 10 drives the mechanism which operates the work.

When the handwheel 28 is operated clockwise, the disks 14 will be moved apart and the disks 15 toward each other and the belt 20 will then assume the position shown in the dotted lines, when shaft 10 will be driven at a much faster speed than shaft 11. When the handwheel 28 is rotated in the opposite direction, the belt will then assume the position in full lines again (Figure 4).

It will be apparent that the position of the disks 14 and 15 will depend upon the position of the belt 20 and that this belt is positioned by the roller 34. In Figures 2, 4 and 6 the roller 34 is always in contact with the belt 20 on the direct line between the center of the shaft 32 and the shaft 10 and between the center of the shaft 32 and the shaft 11, thus positively positioning the belt in each pair of disks. The effective diameter of the belt 20 on disks 14 and 15 is controlled by the roller 34. The roller 34 has a band 42 of non-metallic frictional material and slightly wider than the roller. The outside edges of the band 42 are beveled as shown at 38 and at the same angle or bevel of the conical faces of the disks 14 and 15. The band 42 prevents wear on the roller and also assists in transmitting power from one pair of disks to the other.

The shaft 22 has collars 39 secured thereon by set screws 40 which hold the shaft 22 against endwise movement and consequently hold the roller 34 from endwise movement. In Figure 1, the yoke 23 is fixed to the shaft 22 by means of a screw 41. In this case the roller 34, therefore, is held in fixed sidewise position with reference to the shafts 10 and 11.

In case there should be any slight difference in the tension of the springs 18 or in case any of the disks 14 and 15 should not move free on the shaft, then the swinging of yoke 23 about the center of the pivot shaft 22 will positively position the disks toward which the roller is moving and allow the disks from which the roller is moving to move an equal amount. In other words, the roller keeps the disks centered in the transmission and maintains the belt 20 in correct alignment on the disks.

The width of the beveled faces of roller 34 is slightly less than the exact distance between the disks at this point, so that normally the roller will not be in engagement with the disks but in case the spring tension of the springs 18 is not exactly the same or in case one of the disks should not move freely on the shaft, then the roller 34 will always align the belt and the disks. The diameter of the roller 34, Figures 2 and 4, is such that it is in engagement with the belt at its effective diameter in both pairs of disks. In Figure 2 this result is secured by providing a resilient mounting for the shaft 32, because of the variation in the position of the belt due to the angularity of the belt, does not permit the shaft 32 to move on a true radius from the shaft 22.

To illustrate: Assuming that both pairs of disks are 20 inches in diameter and that the length of belt is such that the effective diameter at which the belt is located in both pairs of disks is 15 inches, now if the disks of one pair of disks are moved toward each other a sufficient distance to move the belt radially outwardly 2 inches, changing the position to a 17 inch effective diameter, then the disks on the opposite shaft would have to move away from each other a greater distance in order to reduce the effective belt diameter to less than 13 inches. Due to the angle at which the belt runs, it is necessary that the effective diameter at which the belt runs on one pair of disks be changed a greater amount than the effective diameter on the other pair of disks in order to maintain a uniform belt tension.

An operable transmission could be made by using a somewhat smaller roller 34. This is shown in the modified form in Figure 5. In order to provide a structure of this kind, it is necessary to make the set of springs on the disks, which are opposite the roller 36, appreciably stronger than the springs on the disks with which the roller engages, this provides that the spring will cause the belt to follow the roller 36 in the disks but also insures separation of the disks engageble by the roller 36.

In Figure 5 the belt 35 is controlled by the roller 36. This roller operates directly against the belt and controls the spacing of disks 37 from each other. The disks 37, of course, are urged toward each other by springs, not shown, and are limited in their movement toward each other by the belt and the roller 36. This construction would provide an operable transmission.

Figure 6 shows a slightly different construction from Figures 2 and 3. In Figure 6 the shaft 59 carrying roller 43 is mounted in bearings which are fixed in relation to the yoke 44. The shaft 45 is mounted in extensions 46 on the frame, the same as shown in Figure 1. In Figure 6, however, the top extension of yoke 44 has a slot 47, the shaft 45 passing through the slot. In addition to shaft 45 the extension 46 also carries shafts 50. These shafts carry rollers 48 and 49. On the sides of the yoke 44 are cam shaped surfaces 51 and 52. The yoke 44 is free to swing about the shaft 45 but is held in contact with the belt by the cam surfaces 51 and 52 and rollers 48 and 49. As the handwheel 58, Figure 6, is turned to swing the yoke 44 from the dotted line position to the full line position, the cam surface 51 which rests against roller 48 is of such shape that it raises the yoke 44 in the slot 47, bringing the center of the shaft 59 nearer the center of the shaft 45. This causes roller 43 to move toward shaft 60 a distance greater than the distance it has moved from shaft 61. The yoke 44 is adjusted by means of a shaft 56 which is threaded through a block 55, the ends of which engage slots 53 in the yoke 44. Collars 57 hold the shaft 56 against endwise movement. The shaft is operated by hand wheel 58. Collars 62 and 63 are mounted on shaft 45 and held in position against the slotted sides of the yoke 44 by suitable screws 64, these collars prevent sidewise movement of the yoke.

From the description and explanation given it will be apparent that this transmission eliminates all thrust bearings, and also all levers, compensating links, shifting nuts, belt tightening nuts, shifting and tightening screws, ordinarily found in such transmissions, and consequently materially simplifies the construction and reduces the cost of variable speed transmissions.

It will be obvious to those skilled in the art that various changes may be made in my device without departing from the spirit of the invention and therefore we do not limit ourselves to what is shown in the drawings and described in the specification, but only as indicated by the appended claims.

Having thus fully described our said invention, what we claim as new and desire to secure by Letters Patent, is:

1. A variable speed transmission device comprising a pair of shafts each carrying a pair of discs with conical interior faces, both discs of each pair of discs being keyed to but axially slidable on the shaft, a belt carried by the said discs, resilient means for holding the disc faces against the belt, and resilient means for positioning the belt, substantially as set forth.

2. A variable speed transmission comprising a pair of shafts having cone-faced pulleys, each pulley comprising a pair of movable separable discs, a belt connecting said pulleys, resilient means for holding the discs of each pulley in engagement with the belt, a pivotally mounted roller engageable with said belt for tensioning the same, and means movably supporting said roller for adjustment toward either of the pulleys while maintaining the portion of the periphery of said roller that is in contact with the belt adjacent the plane of the pulley shafts during such adjustment.

3. A variable speed transmission comprising a pair of shafts having driving and driven pulleys mounted thereon, each pulley comprising a pair of discs having inwardly extending cone faces, a belt mounted about said pulleys, resilient means operating to move each of the discs toward each other and into frictional contact with the sides of the belt, and a roller pivotally mounted intermediate the pulleys and movable toward and from one of the pulleys, said roller being in engagement with the belt to separate the discs when moved toward the pulley and thereby decrease the effective diameter with which the belt engages and to permit each of the discs to move toward the other to increase the effective diameter when the roller is moved away from the pulley, the diameter of said roller being such that it engages said belt at points where the latter contacts with both said pulleys.

4. A variable speed transmission comprising a pair of shafts, a pair of cone-faced discs forming a pulley on each shaft, a belt about said pulleys, resilient means for controlling the effective diameters about which the belt runs on the pulleys, and a single roller pivotally mounted adjacent said discs and engageable with said belt and with the faces of each of said discs to maintain the belt and the pulleys in proper alignment, said roller being movable toward either of the pulleys to vary the effective diameter of this pulley and thereby increase the speed of the shaft upon which this pulley is mounted in relation to the speed of the adjacent shaft, substantially as set forth.

5. A variable speed transmission comprising a pair of shafts, each carrying a pair of discs with conical interior faces, said discs being keyed but laterally slidable on the shafts, a belt carried by the said discs, resilient means for holding the discs in engagement with the belt, a single movable roller engaging the belt and means adjustably supporting said roller for movement from a position in which the portion of the periphery thereof in engagement with the belt lies between one of said pair of discs to a corresponding position with respect to the other pair of discs.

6. A variable speed transmission comprising a pair of pulleys journaled on fixed parallel axes, each pulley including a pair of axially movable cone-faced discs and resilient means for urging the discs together, a V-belt connecting said pulleys, a pivoted roller engaging said belt with the belt-contacting portion of its periphery lying substantially in the axial plane of said pulleys and means for moving said roller toward one pulley and away from the other to move the belt radially on each pulley and thereby change the speed-ratio of the transmission.

7. A variable speed transmission comprising a pair of pulleys journaled on fixed parallel axes, each pulley including a pair of axially movable cone-faced discs and resilient means for urging the discs together, a V-belt connecting said pulleys, a pivoted yoke straddling said belt between said pulleys, a roller yieldingly supported in said yoke and engaging said belt, and means for moving said yoke to shift the relation of said roller and said belt to said pulleys.

8. A variable speed transmission comprising a pair of pulleys journaled on fixed parallel axes, each pulley including a pair of axially movable cone-faced discs and resilient means for urging the discs together, a V-belt connecting said pulleys, a lever pivotally supported for movement in a plane parallel to the plane of said belt, means for shifting said lever longitudinally as the same is turned about its pivot, and a roller pivoted to said lever and adapted to engage said belt to move the same radially on the pulleys and thereby change the speed-ratio of the transmission.

9. A variable speed transmission comprising a pair of shafts having variable diameter pulleys thereon, a V-belt connecting said pulleys, a pivoted yoke straddling said belt between said pulleys, belt-engaging means including a spring-supported roller on said yoke, and means for moving said yoke to shift the relation of said belt to each of said pulleys and thereby change the speed-ratio of the transmission.

10. A variable speed transmission comprising a pair of shafts, a pair of cone-faced discs keyed to each shaft and forming variable-diameter pulleys, each disk of each pair being axially movable upon its shaft, resilient means for urging the discs of each pair together, a V-belt connecting said pulleys, a pivoted roller movable in the plane of said belt and restrained against transverse movement, said roller engaging said belt and engageable with said discs to aline the same with the belt, and means for moving said roller to shift the relation of said belt to each of said pulleys and thereby change the speed-ratio of the transmission.

DARCY E. LEWELLEN.
EMMONS F. LEWELLEN.